United States Patent [19]

Smith et al.

[11] Patent Number: 4,615,672

[45] Date of Patent: Oct. 7, 1986

[54] APPARATUS FOR TRIMMING EXTRUDED STRIP COMPONENTS

[75] Inventors: Larry W. Smith, Toronto, Canada; Larry G. Lowry, Martin, Tenn.

[73] Assignee: The Goodyear Tire & Rubber Company, Akron, Ohio

[21] Appl. No.: 740,173

[22] Filed: May 31, 1985

Related U.S. Application Data

[63] Continuation-in-part of Ser. No. 563,283, Dec. 19, 1983, abandoned.

[51] Int. Cl.⁴ .................. B29C 15/00; A21C 11/00
[52] U.S. Cl. ................. 425/296; 425/302.1; 425/307; 425/308; 425/315; 425/316; 83/101; 83/506
[58] Field of Search ............... 425/296, 302.1, 306, 425/307, 308, 315, 316, 310, 364 B, 301, 28 B; 83/506, 56, 101; 493/352; 270/6

[56] References Cited

U.S. PATENT DOCUMENTS

| | | | |
|---|---|---|---|
| 1,148,146 | 7/1915 | Cameron et al. | 83/506 X |
| 1,465,966 | 8/1923 | Cameron et al. | 83/506 X |
| 1,730,196 | 10/1929 | Pamphilis | 83/506 X |
| 1,821,681 | 9/1931 | Van Stry | 83/506 |
| 2,959,811 | 11/1960 | Curlett | 425/310 X |
| 3,477,895 | 11/1969 | Sauer | 425/28 B X |
| 3,555,945 | 1/1971 | Warthen | 83/56 |
| 3,792,940 | 2/1974 | Thompson | 425/364 B X |
| 3,860,378 | 1/1975 | Nefedov et al. | 425/302.1 |
| 3,949,654 | 4/1976 | Stehlin | 493/352 |
| 3,982,868 | 9/1976 | Rinker | 425/307 X |
| 4,095,926 | 6/1978 | Paul | 425/307 |
| 4,116,096 | 9/1978 | Schiesser | 83/101 |
| 4,193,272 | 3/1980 | Bernard | 425/316 X |
| 4,336,010 | 6/1982 | Thompson | 425/301 X |
| 4,340,342 | 7/1982 | Kim | 425/296 X |
| 4,344,610 | 8/1982 | Jeschke et al. | 270/6 |
| 4,419,065 | 12/1983 | Cox | 425/307 X |

FOREIGN PATENT DOCUMENTS

Ad.24966 of 1895 United Kingdom ............... 425/308

Primary Examiner—J. Howard Flint, Jr.
Attorney, Agent, or Firm—Frederick K. Lacher; T. P. Lewandowski

[57] ABSTRACT

A strip component is extruded through a heated roller die apparatus and fed onto a heated anvil roll where a rotatable knife blade is pressed against the surface of the anvil roll to trim the strip component.

The cutter may have a rotatable knife blade mounted on an arm pivoting about an axis spaced from the surface of the anvil roll for swinging the knife blade into and out of engagement with the strip component on the anvil roll surface. A weight may be attached to the arm for holding the arm down on a stop member in the operative position of the cutter. A number of knife blades may be adjustably mounted on a knife shaft supported by a pair of pivot arms for cutting the strip component at a number of positions across the anvil roll. Alternatively each knife blade may be supported on an individual knife holding body with the knife blade being rotatably mounted on a knife supporting arm which is pivotally mounted on the holding body. The knife supporting arms may also be individually depressed and retracted.

22 Claims, 6 Drawing Figures

APPARATUS FOR TRIMMING EXTRUDED STRIP COMPONENTS

This application is a continuation-in-part of copending U.S. application Ser. No. 563,283 filed Dec. 19, 1983, now abandoned.

The invention relates generally to the cutting or trimming of extruded material and especially to trimming a strip component which is extruded from a roller die extrusion apparatus for tire treads and other strip elements of the tire. A relatively wide strip component band having the desired cross section is extruded and then cut or trimmed into narrower strips for use in building the tires. The selvage cut and trimmed from the extruded strip component band is then guided back to the roller die where it is used again.

Heretofore the extruded strip component has been cut and trimmed on the roller of the roller die extrusion apparatus. One of the problems with trimming on the roller die has been the buildup of the compound on the roller die and the scoring of the roller when steel trim knives are used. This has required users to switch to a less efficient knife of a nonmetallic material.

The present invention is directed to an apparatus for trimming an extruded strip component with steel knives at a position spaced from the roller die to avoid scoring of the roller and accumulation of the compound on the roller. This is done with an apparatus in which the knives are easily adjusted and the cut selvage may be guided back into the roller die.

In accordance with another aspect of the invention there is provided an apparatus for trimming a heated extruded strip component comprising a rotatable anvil roll having an anvil roll surface for supporting the strip component, means for rotating the anvil roll to move the anvil roll surface at substantially the same speed of the strip component is fed to the anvil roll, means for heating the anvil roll to a predetermined temperature, a rotatable knife blade mounted on a knife holding body for movement toward and away from the anvil roll surface to cut the extruded strip component and pressure means mounted on the knife holding body for pressing the knife blade against the anvil roll surface.

In accordance with a further aspect of the invention there is provided an apparatus for trimming a strip component comprising a rotatable knife blade mounted on a knife holding body, the knife holding body being slidably mounted on a knife shaft for adjustment axially of the shaft and a pivotally mounted knife supporting arm with means to depress and retract the arm to press the knife against the strip component and for retracting the arm so that the knife will be retracted from cutting engagement with the strip component.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

Figure 1:
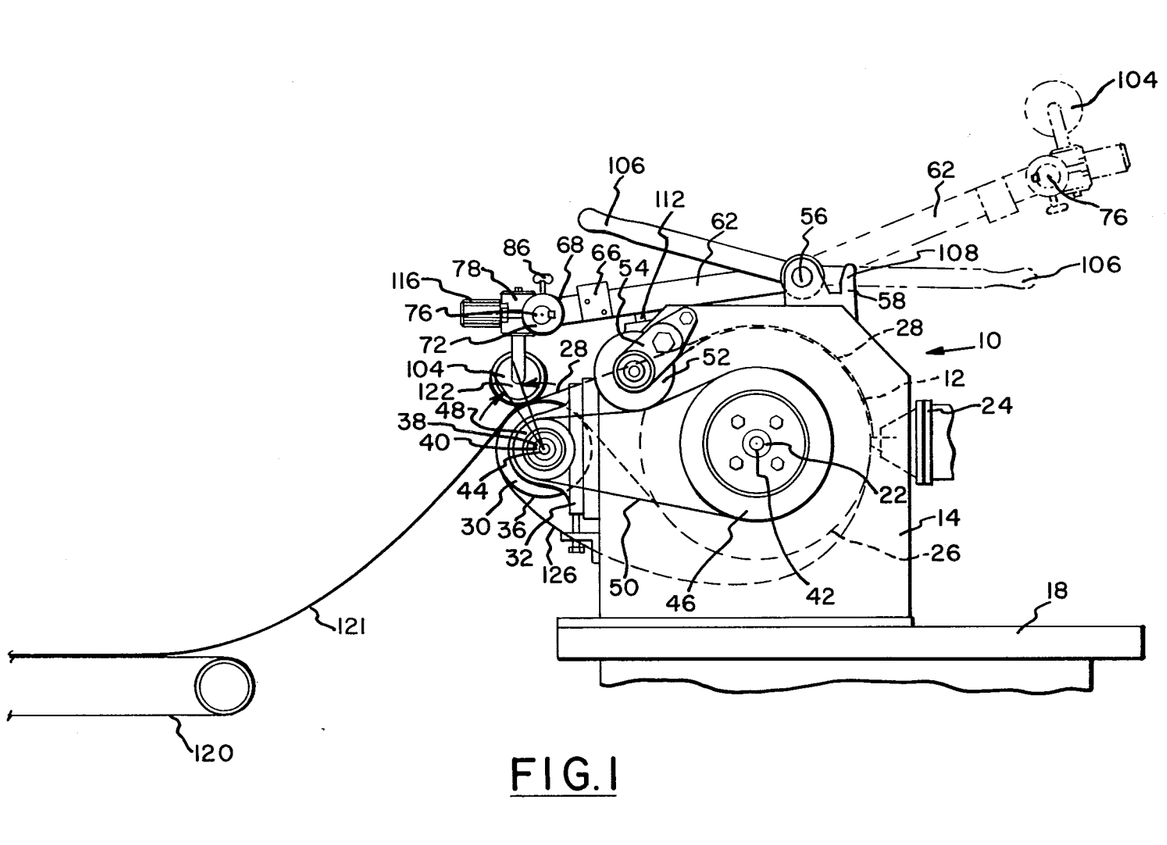
FIG. 1 is a side elevation of a roller die apparatus and anvil roller with cutter and takeaway conveyor, parts being broken away showing the knife blades in the operating position in full lines and in the retracted position in phantom lines.
Figure 2:
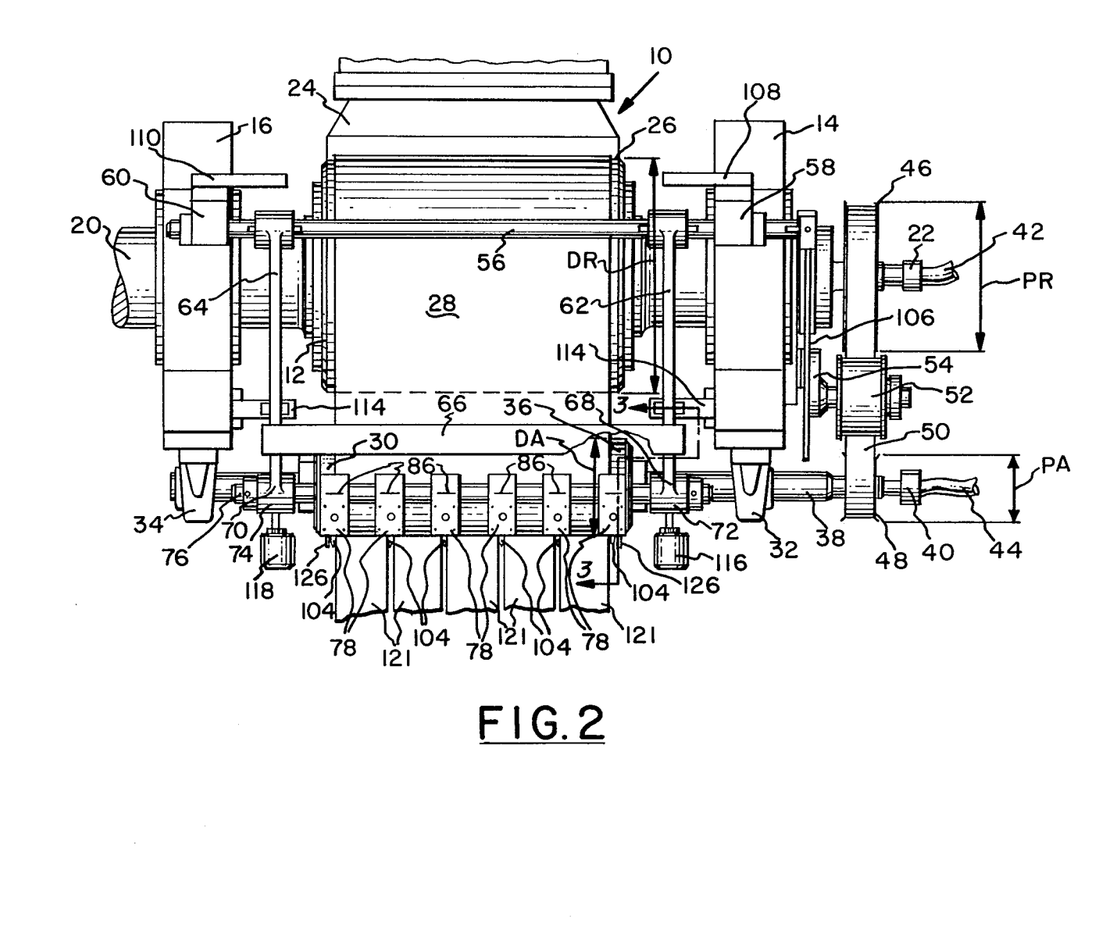
FIG. 2 is a plan view of the apparatus shown in FIG. 1 with parts being broken away.

Referring to FIGS. 1 and 2, a roller die extrusion apparatus 10 is shown having a roller die 12 mounted rotatably on side members 14 and 16 of a supporting frame 18. The roller die 12 is a cylindrical body with cooling passages mounted on a shaft 20 which may be driven by suitable means (not shown). The shaft 20 is hollow at one end for connecting the cooling passages within the roller die 12 to a source of heating fluid, such as water, through a rotary coupling 22 mounted on the end of the shaft. A die head 24 of the roller die extrusion apparatus 10 may be positioned adjacent to and in contact with the roller die 12 for communicating extrudate from an extruder (not shown) through the die head and onto cylindrical surface 26 of the roller die. The extrudate may be in the form of a strip component 28 of natural rubber or other resilient rubberlike material which is heated to an elevated temperature. The elevated temperature is dependent upon the extrusion process and for this example is over 150° F. (65.56° C.).

Adjacent the roller die extrusion apparatus 10 and close to the roller die 12 an anvil roll 30 is rotatably mounted on pillow blocks 32 and 34 fastened to the side members 14 and 16. The anvil roll 30 is hollow and has a cylindrical outer surface 36 which may be heated by hot water or other heating fluid communicated to the space within the anvil roll through a hollow shaft 38 having a rotary coupling 40 at one end. Conduits 42 and 44 are connected to the rotary coupling 22 of the roller die shaft 20 and rotary coupling 40 of the anvil roll shaft 38 and then may be in communication with a source of heating fluid such as hot water for heating the cylindrical surface 26 of the roller die 12 and the cylindrical surface 36 of the anvil roll 30.

A roller die sprocket or pulley 46 is mounted on the shaft 20 and an anvil roll sprocket or pulley 48 is mounted on the shaft 38. A belt 50 which may have spaced-apart lugs for engaging teeth on the pulleys 46 and 48 is positioned around the pulleys so that upon rotation of the shaft 20 of the roller die 12 the anvil roll 30 will also be rotated. An idler pulley 52 is mounted on an idler arm 54 fastened to the side member 14 for engaging the belt 50 and tightening the belt to the desired tension.

A pivot shaft 56 is rotatably mounted on bearing blocks 58 and 60 mounted on the side members 14 and 16 of the supporting frame 18. Pivot arms 62 and 64 are mounted on the pivot shaft 56 at each side of the roller die 12 and extend in parallel relation radially outward from the pivot shaft to a tie bar 66 connecting the pivot arms and maintaining them in parallel relation.

Distal ends 68 and 70 of the pivot arms 62 and 64, respectively, extend beyond the tie bar 66 and have bushings 72 and 74 for receiving a cylindrical knife shaft 76. Mounted on the knife shaft 76 are knife holding bodies 78 each containing a cylindrical opening 80 for the shaft and a key 82 for seating in a key seat 84 of the shaft as shown more clearly in FIG. 3. Each of the knife holding bodies 78 may be moved transversely of the anvil roll 30 and then held in place by a thumbscrew 86 threaded in the knife holding body and extending through to the cylindrical opening 80 for engagement with the knife shaft 76.

Figure 3:
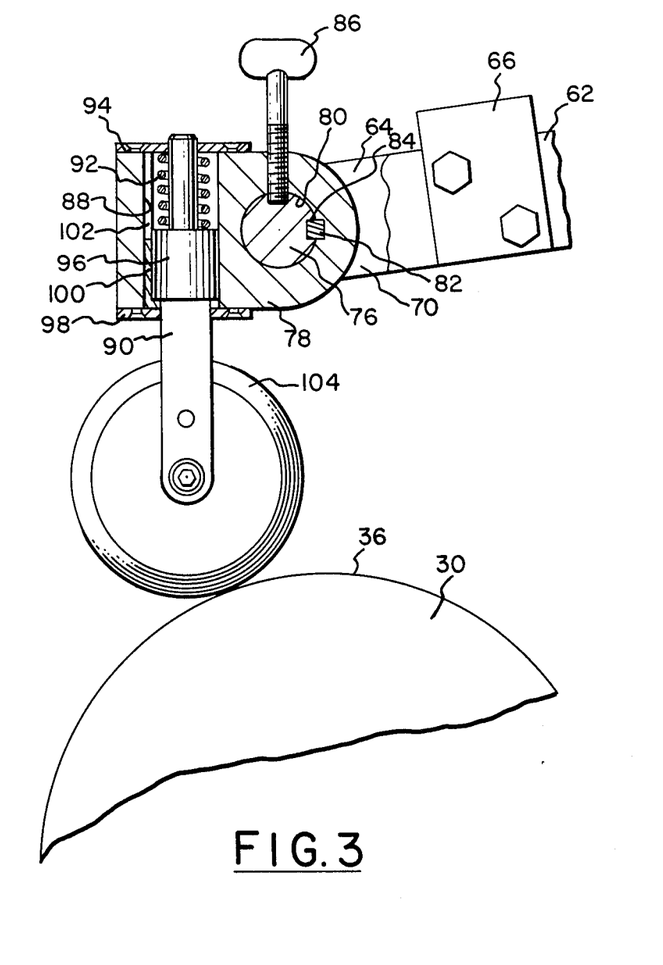
FIG. 3 is an enlarged sectional view of the knife holding body and rotatable knife blade taken along line 3—3 in FIG. 2.

Each of the knife holding bodies 78 has a cylindrical opening 88 through which a knife supporting rod 90 extends and is urged downwardly, as shown in FIG. 3, by pressure means such as coil spring 92 positioned between a plate 94 fastened to each of the knife holding bodies 78 and a sleeve 96 on the rod. The coil spring 92 is retained in the opening 88 by a lower plate 98 fastened to each of the knife holding bodies 78 and engageable with the sleeve 96. A key 100 may be set in a keyway 102 in the sleeve 96 of each of the knife holding bodies 78 to prevent rotation of the rod 90.

A rotatable knife blade 104 is mounted on the end of the knife supporting rod 90 of each of the knife holding bodies 78 for engagement with the cylindrical surface 36 of the anvil roll 30. As shown in FIG. 3, the coil spring 92 of the same or different spring characteristics can be placed in the cylindrical opening 88 of each of the knife holding bodies 78 to apply different pressures against the cylindrical surface 36 by the knife blade 104 where desired.

As shown in FIG. 1, the pivot arms 62 and 64 may be moved from the operating position, shown in full lines, to a retracted position, shown in dotted lines, by pulling on a hand lever 106 and swinging the knife holding bodies 78 on the knife shaft 76 about the pivot shaft 56. The bearing blocks 58 and 60 have stop members 108 and 110, respectively, for limiting the swinging movement of the pivot arms 62 and 64 in the retracted position.

In the operating position, adjstable stop members 112 and 114 are mounted on the side members 16 and 18 and have threaded stops for regulating the position of the pivot arms 62 and 64. Weights 116 and 118 may be fastened to the bushings 72 and 74 at the distal ends 68 and 70 of the pivot arms 62 and 64 for holding the arms and the knife holding bodies 78 in the operating position.

A takeaway conveyor 120 is positioned on the opposite side of the anvil roll 30 from the roller die 12 for carrying cut strips 121 away from the anvil roll after being cut and trimmed. Preferably the takeaway conveyor 120 is operated at a predetermined speed to limit the contact of the strip component 28 with the anvil roll 30. This contact is preferably at least 10 degrees but not over 90 degrees and in the embodiment shown is an arc 122 of the cylindrical surface 36 of from 15 to 20 degrees as shown in FIG. 1.

As shown in the drawings, the anvil roll 30 has a diameter DA less than the diameter DR of the roller die 12. Also the roller die pulley 46 has a diameter PR greater than the diameter PA of the pulley 48 of the anvil roll 30 so that the cylindrical surface 36 of the anvil roll will be driven at substantially the same surface speed as the cylindrical surface 26 of the roller die 12. In this particular embodiment, the anvil roll 30 has a diameter of around 5 inches (12.70 cm) and the roller die 12 has a diameter of about 12 inches (30.48 cm). The roller die pulley 46 has an effective diameter of around 7.64 inches (19.41 cm) and the anvil die pulley 48 has an effective diameter of around 3.18 inches (8.08 cm). Also the roller die pulley 46 has forty-eight teeth and the anvil roll pulley 48 has twenty teeth to maintain this same ratio.

In operation, the strip component 28 is extruded from the die head 24 against the cylindrical surface 26 of the roller die 12 to provide the desired cross-sectional contour. The strip component 28 is then carried on the cylindrical surface 26 which is heated to a temperature generally less than the temperature of the strip component to prevent sticking of the tacky extruded rubber material to the steel material of the roller die 12. With certain materials the temperature of the cylindrical surface 26 may be greater than the temperature of the strip component 28 to prevent sticking. The roller die 12 is rotated at a speed which will provide a surface speed of the strip component 28 on the cylindrical surface 26 of around 60 to 100 feet (18.18 to 30.48 m) per minute. The strip component 28 is directed over the anvil roll 30 which is also heated so that the cylindrical surface 36 has a controlled temperature. In this embodiment, both the anvil roll 30 and the roller die 12 are heated with water at 150° F. (65.56° C.).

The pulley 46 of the roller die 12 drives the pulley 48 of the anvil roll 30 by the belt 50 to rotate the anvil roll at a speed which carries the strip component 28 over the cylindrical surface 36 at substantially the same surface speed as the cylindrical surface 26 of the roller die. The knife blade 104 of each of the knife holding bodies 78 engages the strip component 28 under pressure from the coil spring 92 and severs the strip component into the strips 121 which are carried over the conveyor 120 to suitable take-ups. Selvage 126 is cut from the edges of the strip component 28 and may be guided back into the die head 24 for reusing part of the strip component as shown in FIG. 1. In some applications the cut strips 121 are separated by two knife blades 104 and the cut material between the strips is directed back to the die head 24.

With this construction, the position of the knife holding bodies 78 on the knife shaft 76 may be adjusted to provide different widths of the cut strips 121 of the strip component 28. This may be done with the knife shaft 76 moved away from the anvil roll 30 to a retracted position where it is more accessible as shown in FIG. 1. The anvil roll 30 may also be easily cleaned and any compound which may stick to the anvil roll does not adversely affect the operation of the roller die apparatus 10. By maintaining the cylindrical surface 36 of the anvil roll 30 at a controlled temperature, sticking of the compound of the strip component 28 is substantially reduced providing improved cutting and trimming.

The width of the anvil roll 30 and roller die 12 may vary. In this embodiment the roller die diameter DR is 12 inches (30.48 cm) and the roller die has a width of around 30 inches (76.20 cm). Also because it is desirable to have the anvil roll 30 close to the roller die 12 in order that the strip component 28 may be cut and trimmed as soon as possible before cooling, the cylindrical surface 36 of the anvil roll is within around 2½ inches (6.35 cm) of the cylindrical surface 26 of the roller die 12.

Figure 4:
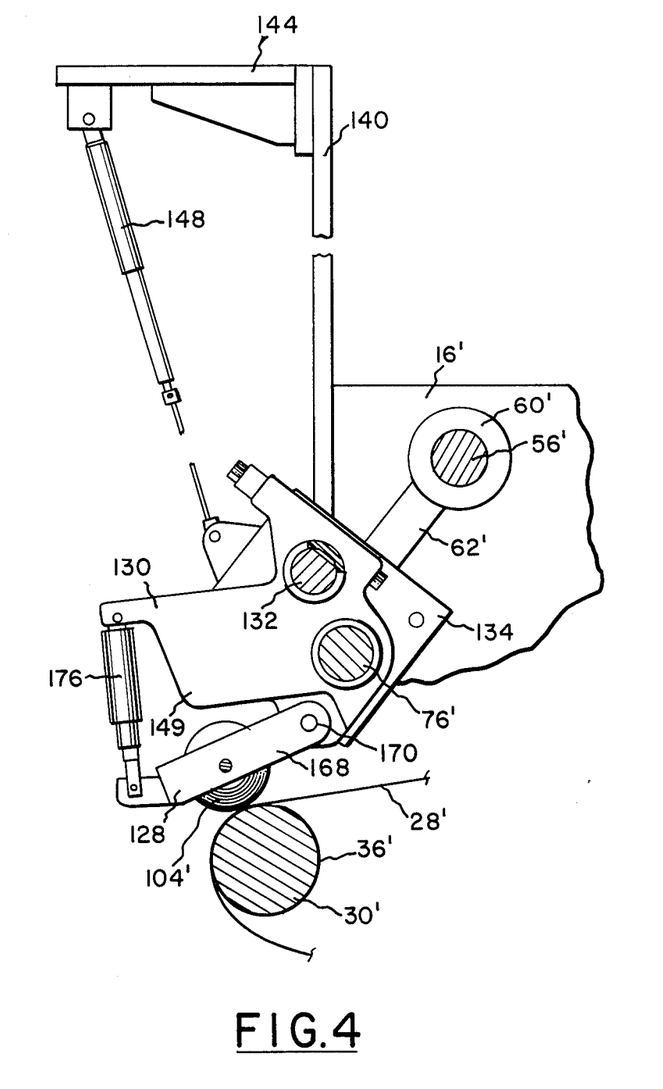
FIG. 4 is a fragmentary side elevation in section of a modification of the invention taken along the line 4—4 in FIG. 5.
Figure 5:
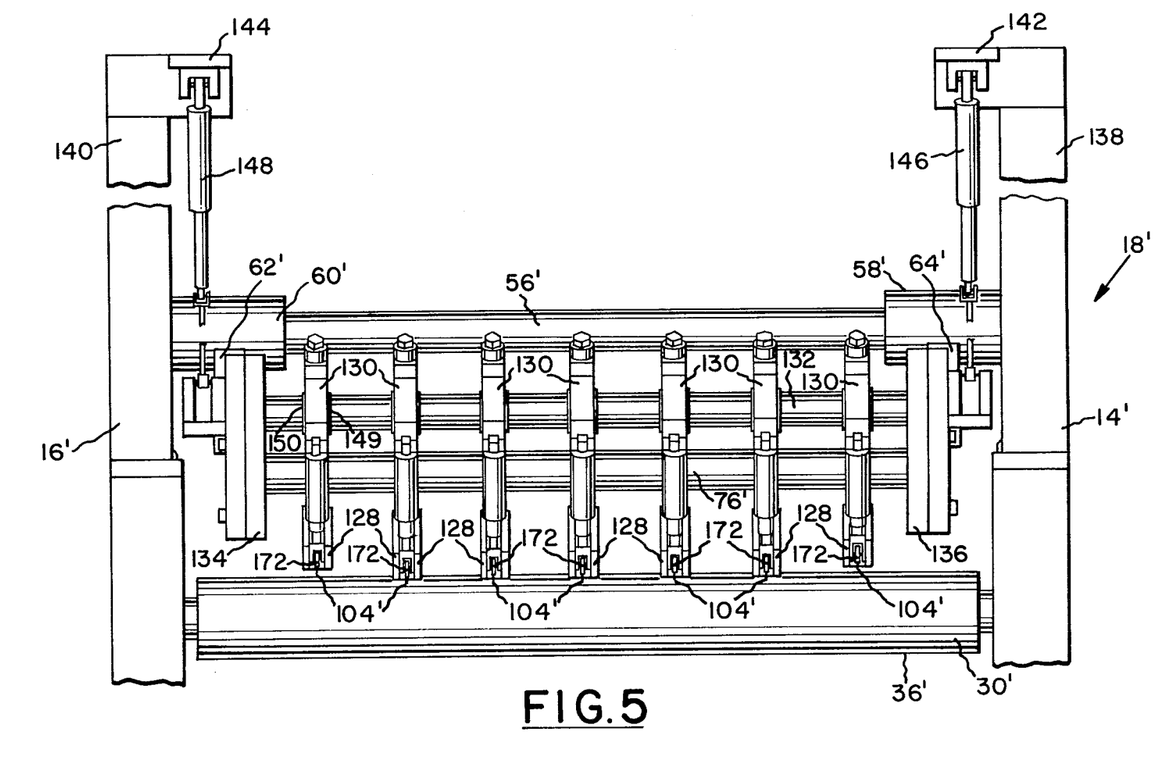
FIG. 5 is a front elevation of the apparatus shown in FIG. 4.
Figure 6:
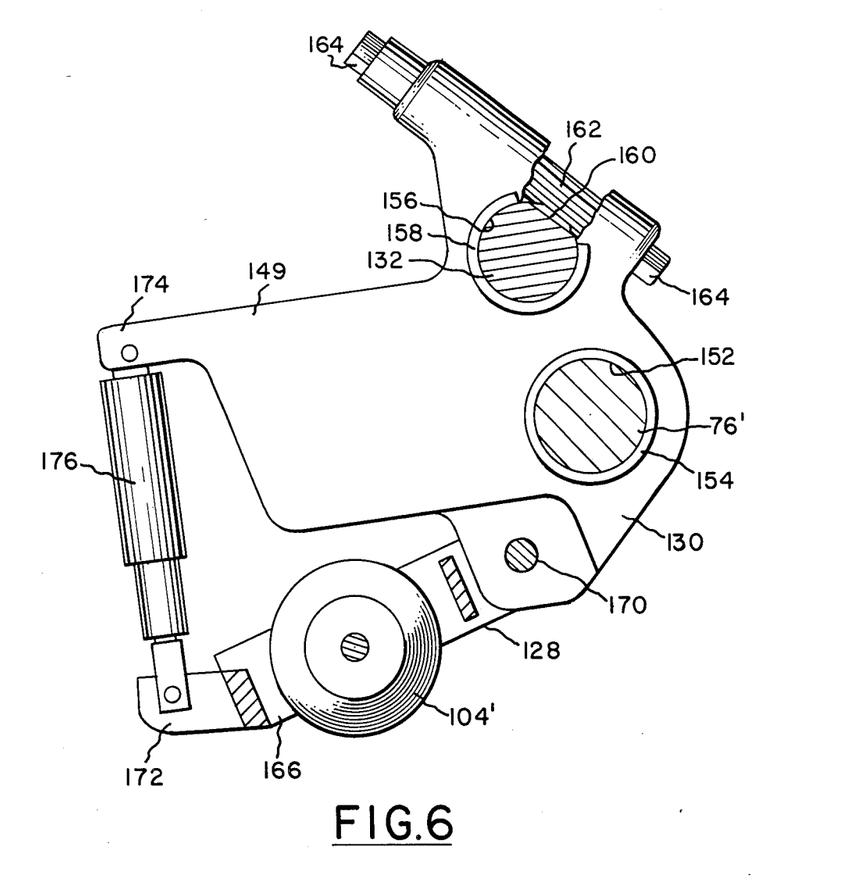
FIG. 6 is an enlarged side elevation of one of the knife holding bodies with parts broken away.

Referring to FIGS. 4, 5 and 6, a modification is shown in which each rotatable knife blade 104' is mounted on a knife supporting arm 128 which is pivotally supported on an individual knife holding body 130. As shown in FIG. 5, the apparatus has a plurality of the knife holding bodies 130 and in this case there are seven bodies positioned transversely across the surface 36' of the anvil roll 30'. Each knife holding body 130 is supported on a knife shaft 76' and a transverse adjustment shaft 132 and are fastened to end plates 134 and 136 adjacent the side members 14' and 16' of the supporting frame 18'. The end plates 134 and 136 are mounted for swinging movement about the pivot shaft 56' on pivot arms 62' and 64' mounted on bearing blocks 58' and 60' rotatably supported on the pivot shaft extending between the side members 14' and 16'.

The side members 14' and 16' have vertical extensions 138 and 140 for supporting booms 142 and 144. At each end of the apparatus, piston and cylinder assemblies 146 and 148 are connected to the ends of the booms 142 and 144 and the end plates 134 and 136. The piston and cylinder assemblies 146 and 148 may be air operated to lift the knife holding bodies 130 away from the anvil roll 30' to adjust the positions of the knife holding bodies on the knife shaft 76' and feed the strip component 28' over the surface 36' of the anvil roll as shown in FIG. 4.

As shown in greater detail in FIG. 6, the knife holding body 130 is a plate member having generally parallel sides 149 and 150 and a cylindrical hole 152 which may contain a bushing 154 for sliding engagement with the knife shaft 76'. The knife holding body 130 may also have another cylindrical hole 156 extending from one side 149 to the other side 150 for sliding engagement with the transverse adjustment shaft 132. A bushing 158 extending part way around the hole 156 may also be provided for sliding engagement with the adjustment shaft 132. As shown in FIG. 6, the exposed side of the adjustment shaft 132 has a rack 160 for meshing engagement with a pinion 162 mounted for rotation in suitable bearings in the knife holding body 130. Hexagonal end portions 164 are provided on the pinion 162 for engagement with a wrench to turn the pinion and move the knife holding body 130 along the knife shaft 76' to a desired cutting position. This is normally done when the knife holding bodies 130 are lifted by the piston and cylinder assemblies 146 and 148; however, some adjustment can be made when the knife blades 140' are in engagement with the strip component 28' during operation.

The knife supporting arm 128 is preferably bifurcated with a pair of legs 166 and 168 positioned at a first end over opposite sides 149 and 150 of the knife holding body 130 where they are pivotally connected by a pin 170. The legs 166 and 168 are joined together at a second end of the arm 128 by a lug 172. Between the lug 172 and a slotted projection 174 of the knife holding body 130 is a piston and cylinder assembly 176 pivotally connected to the slotted projection and the lug for depressing and contrasting the knife supporting arm 128. Preferably the piston and cylinder assembly 176 is double acting and air actuated so that when the arm 128 is moved downwardly by the air pressure in the assembly, this will provide a spring force to urge the knife 104' into cutting engagement with the strip component 28'. The knives 104' are shown in the cutting position in FIG. 5 for the five innermost knife holding bodies 130.

By actuating the piston and cylinder assembly 176 to contract or lift the arm 128, the knife 104' can be moved upwardly out of engagement with the anvil roll 30' to a position such as that shown in FIG. 5 for the outermost knife holding bodies 130. An example of this would be when a narrow strip component 28' is being processed and the outermost knives 104' are not required. Another example would be when a wide strip component 28' is being cut into two strips and all of the knives 104' except the outermost and center knives are contracted.

In operation, each knife holding body 130 is positioned at the desired location transversely of the anvil roll 30' by turning the pinion 162 and causing the knife holding body to move along the knife shaft 76'. With the piston and cylinder assemblies 146 and 148 actuated to lift the knife holding bodies 130 away from the anvil roll 30', a scale may be moved into position and the knives 104' precisely set at the positions desired. When the strip component 28' is fed over the anvil roll 30', the piston and cylinder assemblies 146 and 148 can be actuated to lower the knife holding bodies 130 to a position where the knives 104' are in cutting engagement with the strip component. At this time or before, the piston and cylinder assemblies 176 for the knife holding bodies 130 may be actuated to lift those arms 128 where engagement of the knives 104' with the anvil roll surface 36' is not desired.

While certain representative embodiments and details have been shown for the purpose of illustrating the invention, it will be apparent to those skilled in the art that various other changes and modifications may be made therein without departing from the spirit or scope of the invention.

What is claimed is:

1. Apparatus for trimming a heated extruded strip component comprising a rotatable anvil roll having an anvil roll surface for supporting said strip component, means for rotating said anvil roll to move said anvil roll surface at the same speed said strip component is fed to said anvil roll, means for heating said anvil roll to a predetermined temperature, a rotatable knife blade, means mounting said knife blade on a knife holding body for movement toward and away from said anvil roll surface to cut said extruded strip component, means for mounting said knife holding body and pressure means mounted on said holding body for pressing said knife blade against said anvil roll surface.

2. Apparatus in accordance with claim 1 wherein said knife blade is supported by a knife supporting rod slidably mounted in said knife holding body and said pressure means includes a coil spring disposed between said supporting rod and said knife holding body.

3. Apparatus in accordance with claim 1 wherein said means for mounting said knife holding body includes means for adjustment of said knife holding body axially of said anvil roll on a knife shaft supported by at least one pivot arm for moving said knife holding body toward and away from said anvil roll between an operating position and a retracted position whereby the position of said knife holding body may be adjusted in the retracted position and then said knife holding body lowered to said operating position for contact of said knife with said strip component.

4. Apparatus in accordance with claim 3 wherein said means for mounting said knife holding body includes means for slidably mounting said knife holding body on said knife shaft for adjustment transversely across the surface of said anvil roll, and an adjustable stop member is positioned below said pivot arm for limiting the downward movement of said knife holding body on said knife shaft.

5. Apparatus in accordance with claim 1 further comprising a roller die extrusion apparatus positioned adjacent said anvil roll, said roller die extrusion apparatus including a driven roller die having a roller surface for carrying said strip component and said roller surface having a surface speed substantially equal to the surface speed said strip component is fed to said anvil roll.

6. Apparatus in accordance with claim 5 including drive means for rotating said roller die at a predetermined speed by said drive means and said means for rotating said anvil roll being connected to said drive means to drive said anvil roll at a speed directly proportional to the speed of said roller die to provide substantially the same surface speeds at the cylindrical surfaces of said anvil roll and said roller die.

7. Apparatus in accordance with claim 6 wherein said anvil roll and said roller die are connected by a belt drive with pulleys of a predetermined size to provide substantially the same surface speed of said anvil roll as the surface speed of said roller die.

8. Apparatus in accordance with claim 5 wherein the diameter of said anvil roll is less than the diameter of said roller die.

9. Apparatus in accordance with claim 8 wherein the diameter of said anvil roll is less than one-half the diameter of said roller die.

10. Apparatus in accordance with claim 5 including a takeaway conveyor operable at a predetermined speed to limit the contact of said strip component with said anvil roll surface.

11. Apparatus in accordance with claim 10 wherein said takeaway conveyor is operable at predetermined speeds to limit the contact of said strip component with said anvil roll surface to an arc of at least 10 degrees but not over 90 degrees.

12. Apparatus in accordance with claim 10 wherein said takeaway conveyor is operable at predetermined speeds to limit the contact of said strip component with said anvil roll surface to an arc of from 15 to 20 degrees.

13. Apparatus in accordance with claim 1 wherein said knife holding body has a pivotally mounted knife supporting arm, said pressure means including means to depress and retract said arm and said means for mounting said knife holding means including adjustment means for moving said knife holding means along said knife shaft transversely across the surface of said anvil roll.

14. Apparatus in accordance with claim 13 wherein said knife holding body is one of a plurality of knife holding bodies mounted on said knife shaft each of said knife holding bodies having a pivotally supporting arm with said pressure means including means to individually depress and retract said arm.

15. Apparatus in accordance with claim 13 wherein said adjustment means includes an adjustment shaft supported by at least said one pivot arm and extending through said knife holding body, said adjustment shaft having a rack and a pinion rotatably mounted on said knife holding body having gear teeth in engagement with teeth of said rack on said adjustment shaft for adjusting the position of said knife holding body on said knife shaft by rotating said pinion.

16. The apparatus in accordance with claim 15 wherein said adjustment shaft and said knife shaft are in parallel positions.

17. Apparatus in accordance with claim 15 wherein said knife holding body is one of a plurality of bodies mounted on said knife shaft, said adjustment shaft extending through all of said knife holding bodies, said rack on said adjustment shaft extending over the length of said adjustment shaft and said knife holding body having a pinion with teeth in engagement with the teeth of said rack for individual adjustment of each said knife holding body to a desired position along said adjustment shaft.

18. Apparatus in accordance with claim 13 wherein said knife holding body includes a plate member with side surfaces, a cylindrical hole extending through said knife holding body between said side surfaces for said knife shaft, a first end of said knife supporting arm pivotally connected to said knife holding body, and said means to depress and contract said knife supporting arm interposed between a second end of said knife supporting arm and said knife holding body.

19. Apparatus in accordance with claim 14 wherein said means to depress and contract said knife supporting arm further comprises a piston and cylinder assembly attached to said second end of said knife supporting arm and to said knife holding body.

20. Apparatus in accordance with claim 14 wherein said knife supporting arm is bifurcated with a pair of leg members pivotally mounted to said knife holding body at said first end of said arm on opposite side surfaces of said plate member and joined together at said second end of said knife supporting arm and said rotatable knife being pivotally mounted between said leg members.

21. Apparatus for trimming a strip component comprising a rotatable knife blade mounted on a knife holding body, means for slidably mounting said knife holding body on a knife shaft for adjustment axially of said shaft and a pivotally mounted knife supporting arm with means to depress and retract said arm to press said knife against said strip component and for retracting said arm so that said knife will be retracted from cutting engagement with said strip component.

22. Apparatus in accordance with claim 21 wherein said means to depress and contract said knife supporting arm is a piston and cylinder assembly operable in response to fluid pressure in communication with the cylinder of said assembly.

* * * * *

UNITED STATES PATENT OFFICE
CERTIFICATE OF CORRECTION

Patent No. 4,615,672                  Dated October 7, 1986

Inventor(s) Larry W. Smith and Larry G. Lowry

It is certified that error appears in the above-identified patent and that said Letters Patent are hereby corrected as shown below:

Column 7, lines 37 and 38 "said knife holding means including adjustment means for moving said knife holding means along said" should read --said knife holding body including adjustment means for moving said knife holding body along said--.

Signed and Sealed this

Twenty-second Day of September, 1987

*Attest:*

DONALD J. QUIGG

*Attesting Officer*      *Commissioner of Patents and Trademarks*